United States Patent
Feies (10) Patent No.: US 9,529,573 B2
(45) Date of Patent: Dec. 27, 2016

(54) GRAPHICAL USER INTERFACE GENERATION THROUGH USE OF A BINARY FILE

(75) Inventor: Daniel Feies, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1477 days.

(21) Appl. No.: 12/360,860

(22) Filed: Jan. 28, 2009

(65) Prior Publication Data

US 2010/0192167 A1    Jul. 29, 2010

(51) Int. Cl.
| | |
|---|---|
| *G06F 17/00* | (2006.01) |
| *G06F 9/44* | (2006.01) |
| *G06F 17/24* | (2006.01) |
| *G06F 17/22* | (2006.01) |
| *G06F 17/21* | (2006.01) |
| *G06F 17/30* | (2006.01) |
| *G06F 9/455* | (2006.01) |
| *G06F 3/0481* | (2013.01) |
| *G06F 3/048* | (2013.01) |

(52) U.S. Cl.
CPC .............. *G06F 8/38* (2013.01); *G06F 3/048* (2013.01); *G06F 3/0481* (2013.01); *G06F 8/34* (2013.01); *G06F 9/4443* (2013.01); *G06F 9/45512* (2013.01); *G06F 17/211* (2013.01); *G06F 17/2247* (2013.01); *G06F 17/24* (2013.01); *G06F 17/243* (2013.01); *G06F 17/245* (2013.01); *G06F 17/246* (2013.01); *G06F 17/3089* (2013.01); *G06F 17/30896* (2013.01); *G06F 17/30961* (2013.01)

(58) Field of Classification Search
CPC .... G06F 17/245; G06F 17/246; G06F 17/243; G06F 17/117; G06F 17/24; G06F 17/3089; G06F 17/30905; G06F 9/4443; G06F 9/45512; G06F 8/38; G06F 8/34; G06F 3/0481; G06F 3/048; G06F 17/2247; G06F 17/30961; G06F 17/4443; G06F 17/30896; G06F 17/227
USPC .. 715/234–239, 262, 204; 415/418; 709/203
See application file for complete search history.

(56) References Cited

U.S. PATENT DOCUMENTS

| | | | |
|---|---|---|---|
| 6,404,445 B1 * | 6/2002 | Galea ............... | G06F 17/30905 707/E17.121 |
| 6,405,216 B1 * | 6/2002 | Minnaert et al. ......... | 707/104.1 |
| 7,137,126 B1 | 11/2006 | Coffman et al. | |
| 7,263,654 B2 | 8/2007 | Grambihler et al. | |
| 7,350,199 B2 | 3/2008 | Ito et al. | |
| 2001/0054062 A1 * | 12/2001 | Ismael et al. ................ | 709/202 |
| 2002/0039101 A1 * | 4/2002 | Fernandez et al. .......... | 345/581 |

(Continued)

OTHER PUBLICATIONS

"Cover Pages", "Relational Markup Language (RML)", retrieved at <<http://xml.coverpages.org/rml.html>>, Dec. 17, 2008, pp. 1-7.

(Continued)

*Primary Examiner* — Quoc A Tran
(74) *Attorney, Agent, or Firm* — Anand Gupta; Tom Wong; Micky Minhas (57) ABSTRACT

A system for generating and displaying a graphical user interface on a computer screen is described herein. The system includes a receiver component that receives a binary formatted file and a virtual machine that generates a graphical user interface based at least in part upon the binary formatted file. A display component causes the graphical user interface to be displayed on the computer screen.

20 Claims, 8 Drawing Sheets

(56) References Cited

U.S. PATENT DOCUMENTS

| | | |
|---|---|---|
| 2004/0133855 A1* | 7/2004 | Blair et al. .................... 715/517 |
| 2005/0155027 A1 | 7/2005 | Wei |
| 2005/0268338 A1* | 12/2005 | Made .............................. 726/24 |
| 2006/0063518 A1* | 3/2006 | Paddon et al. ................ 455/418 |
| 2006/0112338 A1 | 5/2006 | Joung et al. |
| 2006/0230339 A1 | 10/2006 | Achanta et al. |
| 2007/0182978 A1 | 8/2007 | Nakamura et al. |
| 2008/0155517 A1 | 6/2008 | Yan et al. |
| 2008/0244531 A1* | 10/2008 | Schmelter et al. ........... 717/128 |
| 2014/0040333 A1* | 2/2014 | Tsao .............................. 707/829 |

OTHER PUBLICATIONS

Fox, et al., "Real Time Streaming Data Grids", retrieved at <<http://64.233.183.132/search?q=cache:hQ9QFkv_5LQJ:www.servogrid.org/slide/iSERVO/Misc/TIWDC2005-Fox-4.doc+%22binary+format%22+%22markup+language%22+convert+ieee&hl+32 en&ct=clnk&cd=41&gl=in>>, Dec. 17, 2008, pp. 1-10.

* cited by examiner

GRAPHICAL USER INTERFACE GENERATION THROUGH USE OF A BINARY FILE

BACKGROUND

As processing capabilities and memory on personal computers has increased, graphical user interfaces displayed on personal computer devices have become more robust and aesthetically pleasing. For example, a client side graphical user interface for an exemplary application may include numerous elements that can have a plurality of properties and property values associated therewith. For instance, an exemplary graphical user interface may include a plurality of depressible buttons, selectable contacts, slide bars, emoticons, etc. These elements may have particular shapes and/or colors and may change shape or color upon a certain action being undertaken by a user of the graphical user interface.

Conventionally, graphical user interfaces are designed using a markup language which may be similar to HTML. An exemplary markup file may include numerous strings, elements, properties, values and/or the like. The markup file is traditionally transmitted from an application server to a client device together with a library that informs the client device of how the markup file is to be interpreted. At runtime, the markup file must be parsed to allow the client device to display a corresponding graphical user interface on a display screen. For complex graphical user interfaces, however, parsing the markup file can be relatively resource intensive.

SUMMARY

The following is a brief summary of subject matter that is described in greater detail herein. This summary is not intended to be limiting as to the scope of the claims.

Described herein are various technologies pertaining to generating a graphical user interface through use of a binary formatted file. Pursuant to an example, a markup file can be utilized by a developer to describe a graphical user interface. For instance, the markup file can include one or more elements, properties that describe the elements, and values for such properties, wherein an element may be an entity that is to appear on the graphical user interface such as a button, a particular icon, etc, and a property can describe an element. For example, a property may be color, shape, location, etc. Similarly, a value can be assigned to a property to describe the elements. Thus, for instance, a property may be color and a value may be a particular color. Similarly, a property may be location and a value may describe the location.

At build time, the markup file can be parsed and a representative tree can be generated in memory. For example, nodes of the tree may represent elements, properties, values, strings, scripts, etc. In a detailed example, a node in the tree may be an element which may have a child node that is a property. In turn, the child node that represents the property may also have a child node that represents a value of the property. Thus, the tree can be representative of the graphical user interface that is desirably displayed on a display screen. The resulting tree may be subjected to one or more optimization functions and the tree can be validated.

A binary formatted file and corresponding commands may then be generated based at least in part upon the optimized/validated tree. For instance, the binary formatted file may include a plurality of tables such as a table that includes strings, elements to be included in the graphical user interface, a table that includes properties of such elements, and a table that includes values of such properties. The binary formatted file may additionally include a header and offsets to tables in the binary formatted file. Since strings, elements, properties and values are included in tables in the binary formatted file, such strings, elements, properties and values do not need to be repeated in the binary formatted file for each occurrence of a string, element, property, or value in the representative tree. Accordingly, the binary formatted file can be substantially smaller than a markup file and may be parsed much more quickly when compared to the parsing of a markup file. The optimized tree may also be used to generate commands for scripts, elements, properties, values, etc. For instance, if the tree includes an element that is to be built at a client device when the graphical user interface is created, an index to the element in an element table can be generated. Additionally, a command that causes the element to be built can also be generated and placed in the binary formatted file or in a file that is to accompany the binary formatted file.

In the runtime environment, the binary formatted file can be loaded and used by a virtual machine to generate the graphical user interface. More particularly, a client computing device can receive the binary formatted file and can have access to a library that includes data that allows the binary formatted file to be read and interpreted. For instance, the library can be part of a dynamic link library that is shipped with an application that uses the graphical user interface. The virtual machine can locate a markup section in the binary formatted file and use such section to create a tree that can be employed in connection with generating the graphical user interface. Thus, the virtual machine can execute commands generated at build time and included in the binary formatted file and/or associated with the binary formatted file.

Other aspects will be appreciated upon reading and understanding the attached figures and description.

DETAILED DESCRIPTION

Various technologies pertaining to the generation of graphical user interfaces will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
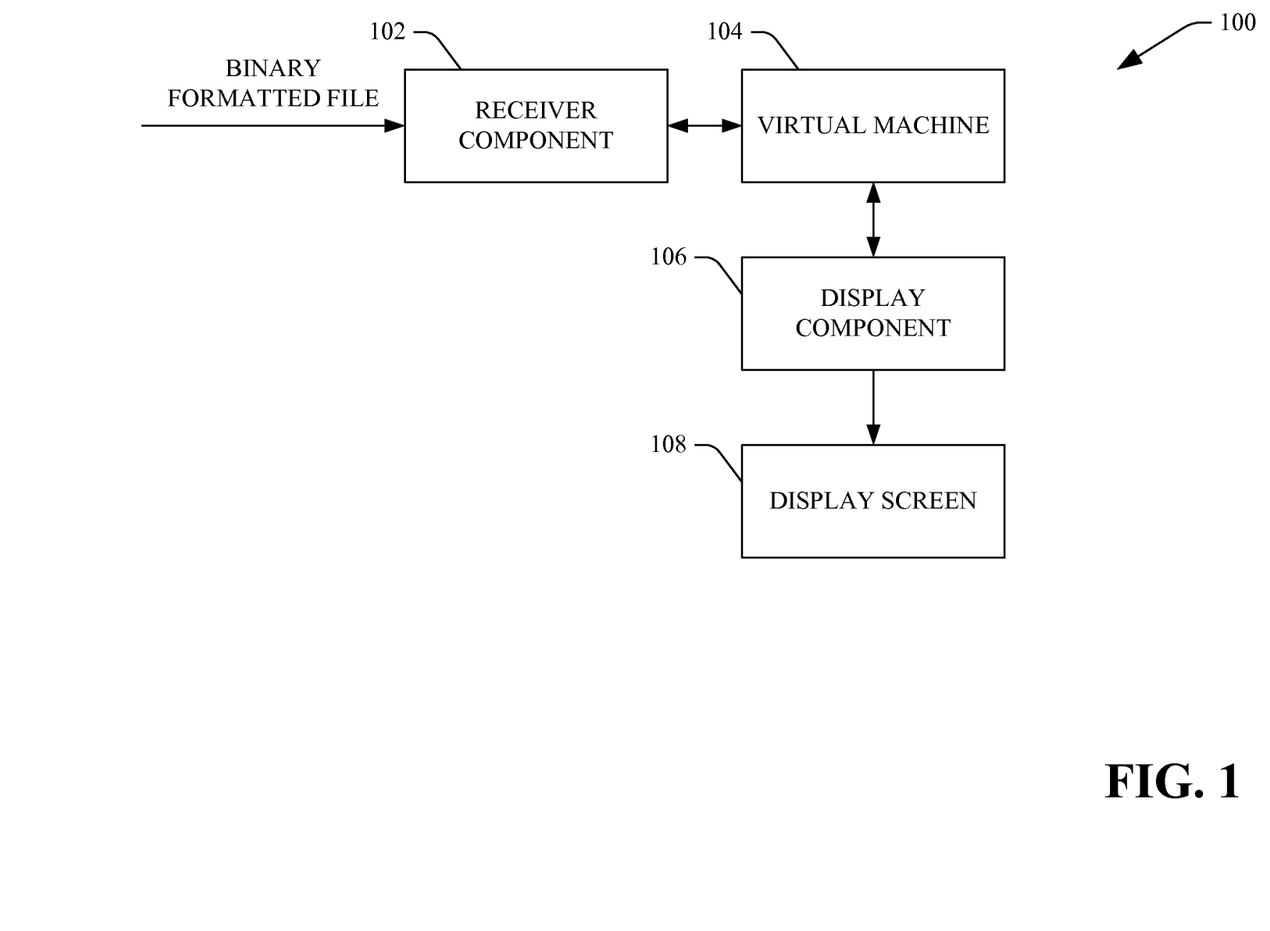
FIG. 1 is a functional block diagram of an example system that facilitates displaying a graphical user interface on a display screen.

With reference to FIG. 1, an example system 100 that facilitates generating a graphical user interface based at least in part upon a binary formatted file is illustrated. The system 100 may reside on a client computing device such as a personal computer, a personal digital assistant, a laptop computer, a mobile telephone and/or the like. The system 100 can include a receiver component 102 that receives a binary formatted file, which is a computer file that can include data encoded in binary form for storage and processing purposes. As will be described in greater detail herein, the binary formatted file can include a plurality of tables, a header, markup section and metadata for instance that can be used by a virtual machine in connection with interpreting the binary formatted file.

The system 100 may also include a virtual machine 104 that can generate a graphical user interface based at least in part upon the binary formatted file. Pursuant to an example, the binary formatted file may be received from an application server that can be accessed by way of the Internet, can be received through use of a web service and/or can be retained in a data repository on the client computing device. As will be described in greater detail herein, a virtual machine 104 can build a tree that is representative of the graphical user interface which can be presented to a user.

The system 100 may further include a display component that causes the graphical user interface generated by the virtual machine 104 to be displayed on a display screen 108. For instance, the display component 106 can cause elements in a liquid crystal display screen to display a graphical user interface represented by the binary formatted file.

Figure 2:
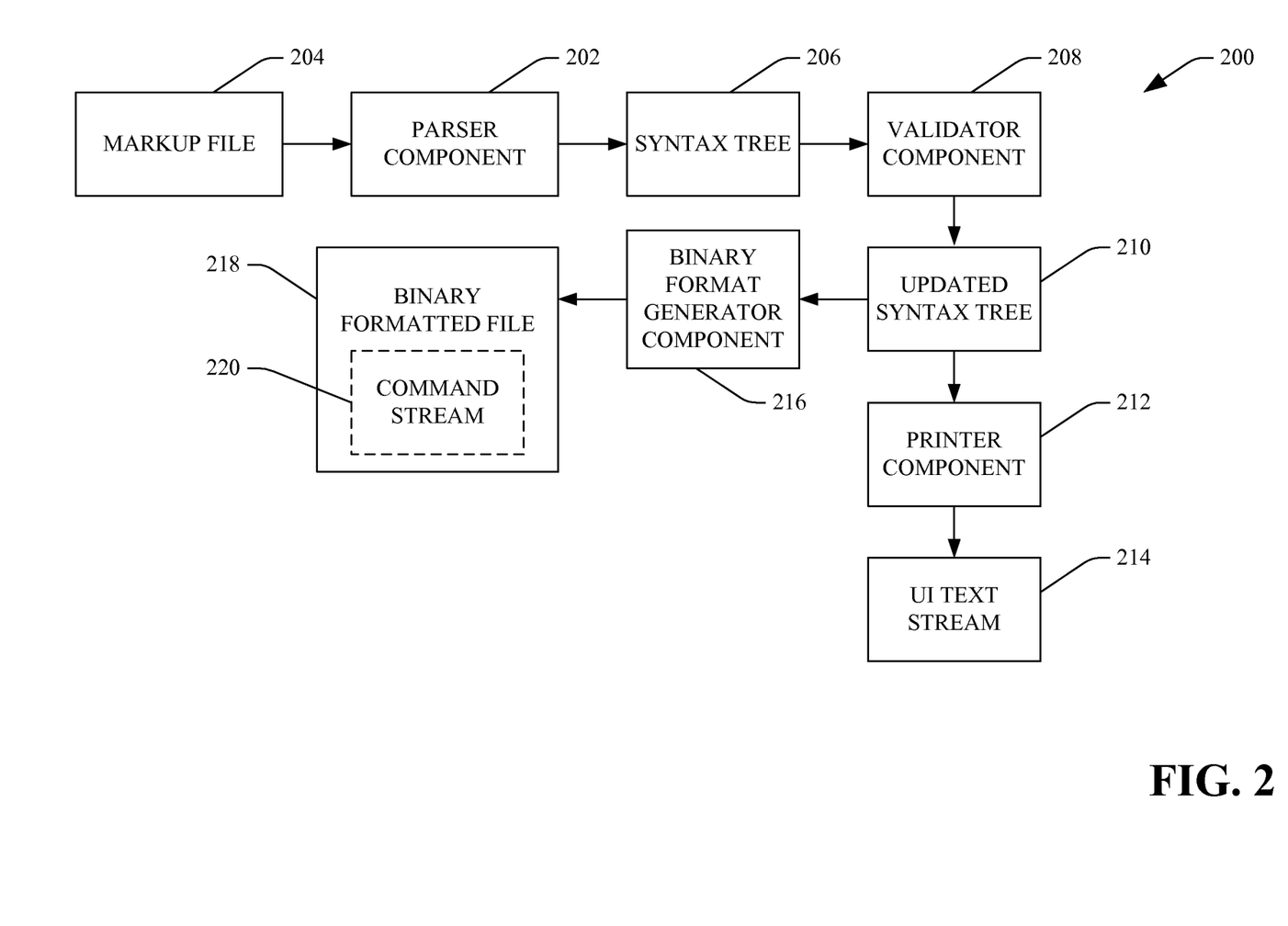
FIG. 2 is a functional block diagram of an example system that facilitates generating a binary formatted file based at least in part upon a markup file.

Referring now to FIG. 2, an example system 200 that facilitates creating a binary formatted file based at least in part upon a received markup file is illustrated. The system 200 includes a parser component 202 that can parse a markup file 204 generated by a developer, wherein the markup file 204 describes a graphical user interface. Pursuant to an example, the markup file 204 can be a file that employs a markup language that is similar to HTML.

The markup file 204 may include numerous elements that may be desirably displayed on a graphical user interface such as buttons, sliders or other graphical elements. The markup file 204 may additionally include properties that correspond to elements. For instance, a property may be a color, location, size of an element, etc. The markup file 204 may additionally include values for properties corresponding to one or more elements. For instance, an element may be a button, a property can be a color and a value of such property may be red. The markup file 204 may additionally include one or more strings such as a character string. These strings may also have properties and values that correspond thereto. The markup file 204 can also include styles, which may be a combination of properties and values that together can describe a style of an element. Furthermore, the markup file 204 may include one or more scripts which can describe an action corresponding to an element upon a user selection of such element. For example, a script may cause a button to change color when such button is selected by the user.

The parser component 202 can parse the markup file 204 and generate a syntax tree 206 that is representative of a desirably created graphical user interface. More particularly, the syntax tree 206 can be retained in memory and can be an in-memory representation of the markup file 204. The syntax tree 206 can include a plurality of nodes that can be representative of elements, properties, values, strings, scripts, styles, etc. Each node in the syntax tree 206 can be assigned a title that indicates whether such node is representative of an element, a property, a value, a string, a script, a style, etc. The parser component 202 can generate a root node which can be assigned a class, and all other nodes in the syntax tree 206 can be instances of such class.

The system 200 may additionally include a validator component 208 that can receive the syntax tree 206 and validate such tree. For instance, the validator component 208 can insure that the syntax tree 206 is properly balanced (e.g., determine that an element has been opened but not closed). Additionally, the validator component 208 can analyze the syntax tree 206 and generate one or more subtrees and can provide such subtrees with identities (e.g., names, numerical identities, . . . ) and properties. For instance, a developer can indicate in the markup file 204 that a particular arrangement of an element, property, and value is repeatedly used in the markup file 204, and such combination can be represented through use of a subtree. The parser component 202 can generate subtrees in the syntax tree 206 and the validator component 208 can prune duplicative subtrees from the syntax tree 206. Thus, a subtree that appears multiple times in the syntax tree 206 need not be copied multiple times. Furthermore, a same bug that may reside in the markup file need not be fixed in several substantially similar subtrees. Additionally, the validator component 208 can also locate null nodes in the syntax tree (e.g., a node with no corresponding identity or text), and such null nodes can be removed from the syntax tree 206. Upon validating/optimizing the syntax tree 206, the validator component 208 can output an updated syntax tree 210.

The system 200 may additionally optionally include a printer component 212 that can receive the updated syntax tree 210 and can output a textual description of the updated syntax tree 210 (a UI text stream 214). The UI text stream 214 can be used in connection with locating bugs in the updated syntax tree 210 and/or errors in the process of generating the updated syntax tree 210. For instance, if a bug exists in the parser component 202 and a graphical user interface cannot be generated through use of the updated syntax tree 210, the UI text stream 214 can be analyzed to determine an origin of the bug (e.g., to determine if there is a problem with the parser component 202 or in the markup file 204).

The system 200 can further include a binary format generator component 216 which receives the updated syntax tree 210 and generates a binary formatted file 218 based at least in part upon the updated syntax tree 210. Pursuant to an example, the binary format generator component 216 can make multiple passes over the updated syntax tree 210. For instance, the binary format generator component 216 can identify strings, elements, properties, values, styles, etc. in the updated syntax tree 210 and can build tables for such strings, elements, properties, values, styles, etc. Thus, the binary format generator component 216 can build an elements table that includes each element used by the developer in the markup file 204 (and existing in the updated syntax tree 210). The binary format generator component 216 may then make a second pass over the updated syntax tree 210, wherein during the second pass the binary format generator component 216 outputs code that can be used to build the graphical user interface. For instance, the updated syntax tree 210 may include an element, and during the second pass the binary format generator component 216 can locate such element. The binary format generator component 216 may then generate an index into the element table created in the first pass and output code that can be read, for instance, by a virtual machine on a client device that can cause the element to be built at the client device. Thus, the binary format generator component 216 can generate a command stream 220 that can be included in the binary formatted file 218 based at least in part upon the updated syntax tree 210, wherein the command stream 220 can be accessed and interpreted by a virtual machine on a client device to build the graphical user interface. As noted above, code in the command stream 220 can reference elements, properties, etc. in tables of the binary formatted file 218. Commands generated by the binary format generator component 216 can be referred to herein as P-Codes, which describe various operations that can be executed by the virtual machine. Examples of commands include push, pop, call, jump, return, add, sub, min, max, create element, create property, create resource, create value, create behavior, etc.

From the above it can be discerned that at least a portion of the system 200 may reside on a computer at a development site. In another example, at least the binary formatted file 218 and corresponding command stream 220 may reside on an application server that is accessible to users by way of the Internet.

Figure 3:
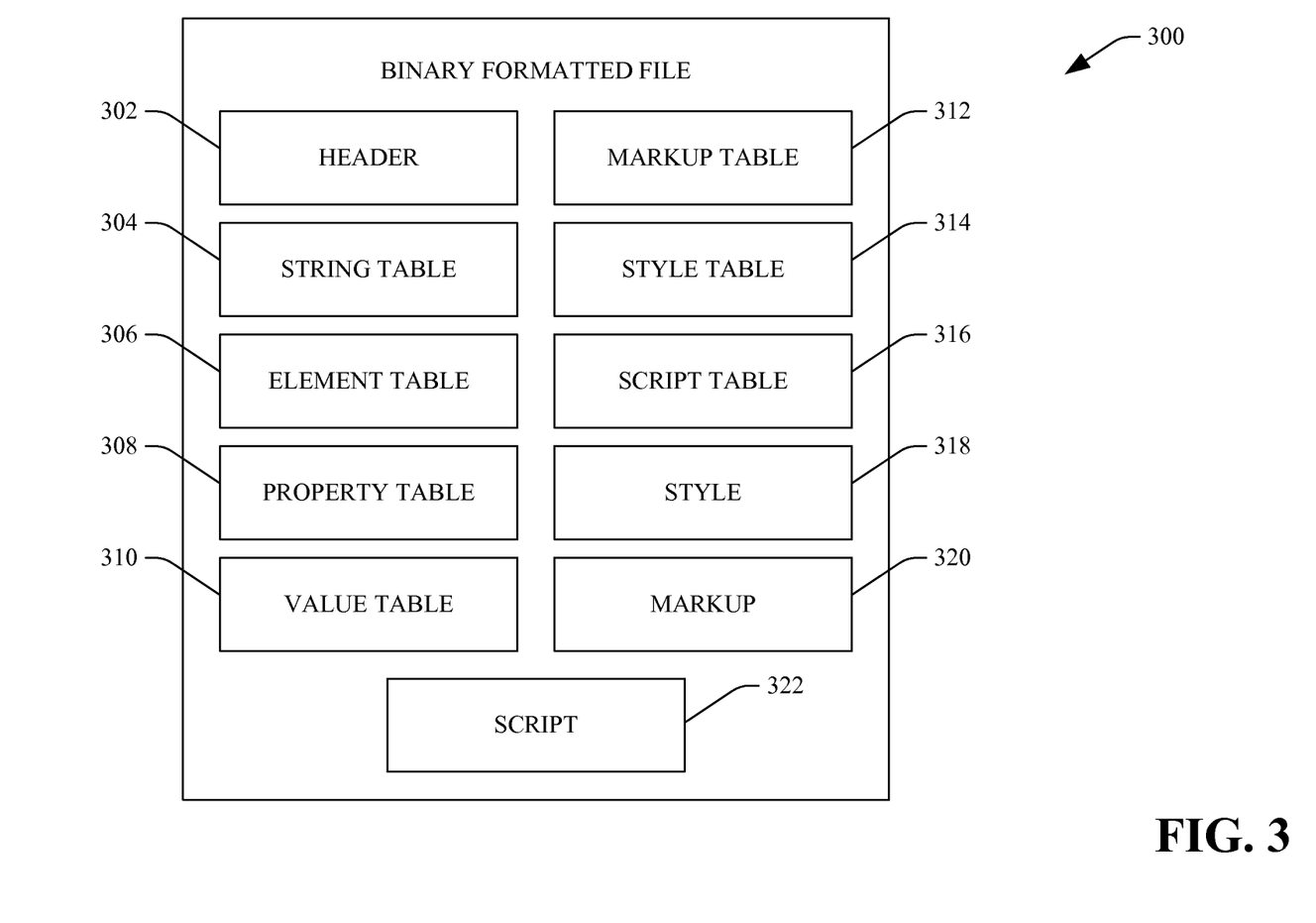
FIG. 3 is an example depiction of a binary formatted file.

Referring now to FIG. 3, an example depiction of a binary formatted file 300 that can be generated by the binary format generator component 216 based at least in part upon a syntax tree is illustrated. The binary formatted file 300 may include a header 302. For example, the header 302 may include a signature, such that when the binary formatted file 300 is loaded at runtime the file format can be ascertained. Additionally, the header 302 may include data indicative of a version (e.g., a version number), such that when the binary formatted file is loaded at runtime the correct version is loaded. The header 302 may also include data indicative of size of the binary formatted file and can also include offsets into tables of the binary formatted file 300. Thus, when the binary formatted file 300 is parsed at runtime, locations of tables in the binary formatted file 300 can be indicated in the header 302. The header 302 may also optionally include a checksum and/or an indication of a size of a stack to create when building the graphical user interface.

The binary formatted file 300 may also include a string table 304, which can comprise character strings existent in a markup file used in connection with generating the binary formatted file. For instance, strings in the string table 304 can be organized as an array of strings separated by a particular character such as \0.

The binary formatted file 300 can also include an element table 306. The element table 306 may include a list of identities (e.g., names, numerical identities, . . . ) of elements that are desirably included in the graphical user interface, wherein such table can be used as an index to locate such elements (which may be retained in the binary formatted file 300 or included in a corresponding file). For instance, an element may be a button, a checkbox, a graphical icon, etc.

The binary formatted file 300 can further include a property table 308. The property table 308 can include a list of identities of properties that describe elements in the elements table 306, wherein such property table 308 can be used as an index to locate such properties (which may be retained in the binary formatted file 300 or in a corresponding file). As noted above a property may describe an element, and may be color, shape, location, etc.

The binary formatted file 300 may further include a value table 310 that can include identities of various values that may be assigned to one or more properties listed in the property table 308. The value table 310 table can be used as an index to locate values (which may be retained in the binary formatted file 300 or included in a corresponding file). For instance, if a property in the property table 308 is color, a corresponding value may be red, blue, green, etc. In another example, if a property in the property table 308 is a location, a value in the value table 310 may be aligned left, aligned right, centered, etc.

The binary formatted file 300 can also include a markup table 312 which includes an index to representative trees corresponding to the updated syntax tree 210 (FIG. 2). As noted above, the updated syntax tree 210 may include a main tree as well as subtrees. If the updated syntax tree 210 includes the main tree and two subtrees, the markup table 312 will include three entries (one for the main tree and one for each subtree).

The binary formatted file 300 may also optionally include a style table 314 which can comprise an index to styles corresponding to one or more elements listed in the element table 306. For instance, if the graphical user interface desirably includes a plurality of elements that are to look substantially similar to one another, such elements can be defined by way of a style listed in the style table 314. Alternatively, the elements may be described through use of properties and values listed in the property table 308 and value table 310, respectively.

The binary formatted file 300 can also include a script table 316 which can include an index to scripts that define actions of an element given particular user input or contextual information. For instance, for a certain element, upon user selection of such element, it may be desirable to cause the element to change color or shape. The script table 316 can include an index to scripts that cause such alternation of an element to occur.

The binary formatted file 300 may additionally include a style section 318, a markup section 320 and a script section 322. The style section 318 can be where in the binary formatted file 300 a particular style is stored. Similarly, the markup section 320 can be where a tree is stored and a script section 322 can be where scripts are stored. Thus to locate a particular style, for example, the header can be accessed to determine an offset to the style table 314. The style table 314 can then be searched for the identity of the desired style and an offset into the style section 318 can be located. The markup section 320 in the script section 322 can be used in a manner similar to that of the style section 318.

Figure 4:
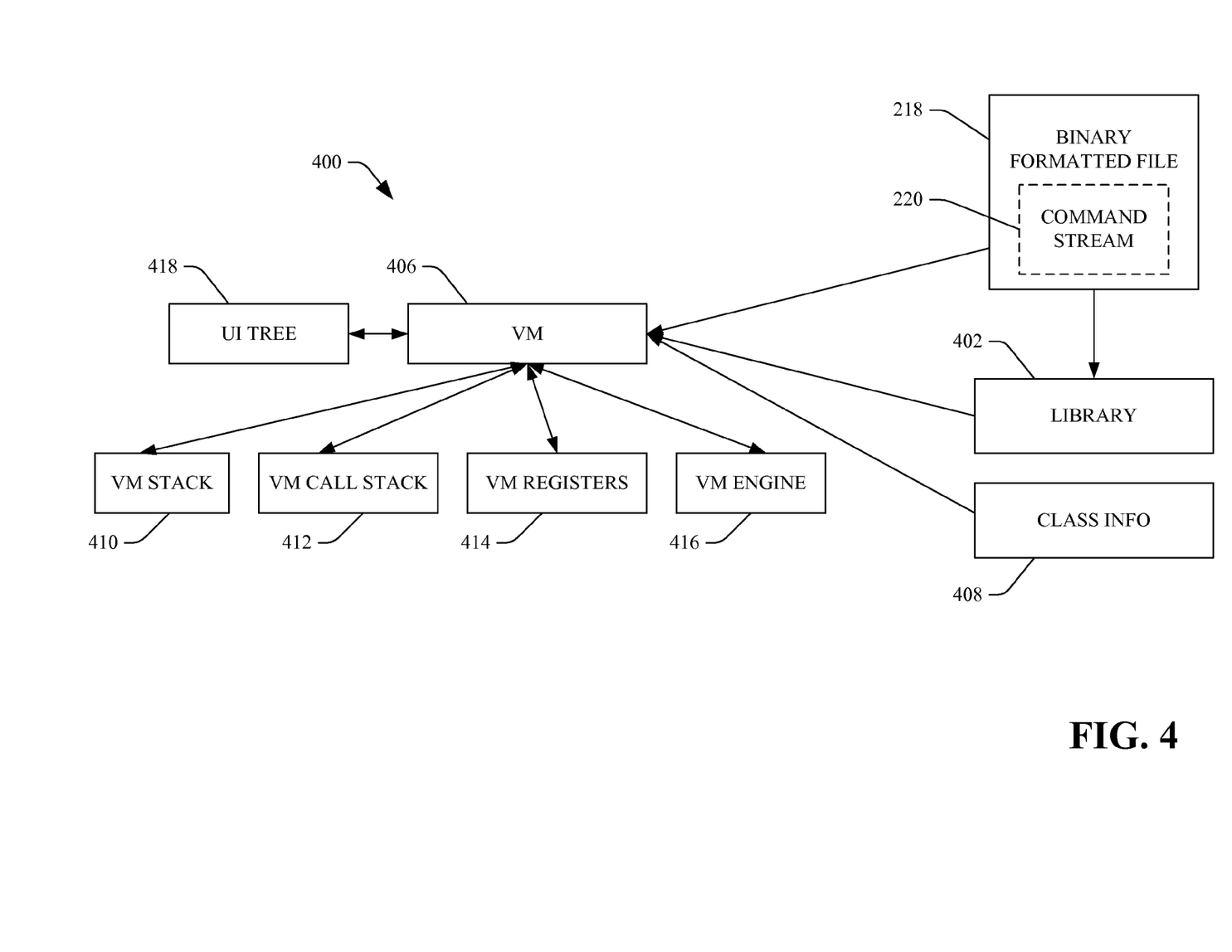
FIG. 4 is a functional block diagram of an example system that facilitates building a graphical user interface based at least in part upon a binary formatted file.

Referring now to FIG. 4, an example system 400 that facilitates generating a graphical user interface based at least in part upon a binary formatted file is illustrated. In an example, the binary formatted file 218 can be selected for execution in the system 400 based at least in part upon an identity (e.g., name, numerical identity, . . . ) assigned to the binary formatted file 218. The system 400 can reside on a client computing device that can include a display screen, wherein the generated graphical user interface is displayed on such display screen. The system 400 includes a library 402 which includes information pertaining to interpreting the contents of the binary formatted file 218 (which includes the command stream 220) generated by the binary format generator component 216 (FIG. 2). For instance, the library 402 may be a portion of a dynamic link library that is shipped with an application that corresponds with the desirably generated graphical user interface. When a command is received to load the binary formatted file 218, a call to the library 402 is made and the binary formatted file 218 can be loaded and initialized. In an example, loading and initializing the binary formatted file 218 can include setting up tables in the binary formatted file 218 in memory of the client computing device. Furthermore, the binary formatted file 218 can be represented by an object, wherein the object can be used in connection with creating elements, looking up property strings, etc. Using an object representative of the binary formatted file 218 can provide an abstract mechanism of reviewing contents of the binary formatted file 218.

The system 400 can further include a virtual machine 406, which can receive commands in the command stream 220 and begin building entities using the commands in the command stream 220. The virtual machine 406 can access a tree in a markup section of the binary formatted file 218 and can receive information pertaining to nodes of the tree from class information 408, which may be shipped together with the binary formatted file 218. In other words, the virtual machine 406 recreates the updated syntax tree 210 by accessing tree information in the binary formatted file 218 and executing commands in the command stream 220.

When building elements, properties, values, etc. the virtual machine 406 can generate a virtual machine stack 410 and a virtual machine call stack 412. The creation of the two stacks 410 and 412 allow substantially simultaneous creation of different elements (e.g., using two call stacks 410 and 412 allows for re-entrances). In an example, the virtual machine 406 can read commands from the command stream 220. While reading such commands, another file (in a format similar to that of the binary formatted file 218) can be loaded. In an example, the binary formatted file 218 can include information pertaining to generation of a graphical user interface for a main window of an application and another file in a similar format may include data pertaining to generating a graphical user interface within such main window. The binary formatted file 218 to be loaded in the virtual machine 406 can build elements, properties, values, etc. through use of commands in the command stream 220. The virtual machine 406 may, however, reach a portion of such file that pertains to the sub-window referred to previously. The second file can be loaded and the virtual machine 406 can begin building elements, properties, values, etc. pertaining to the second file. When re-entrance is performed, everything generated by the virtual machine 406 can be placed in the virtual machine call stack 412 and saved. The virtual machine 406 may then create a smaller subtree and such information may be stored in the virtual machine stack 410. After creation of such subtree the virtual machine 406 can perform a pop operation and pull data from the virtual machine call stack 412.

Virtual machine registers 414 may also be included in the system 400 and may be used in connection with maintaining a pointer into the command stream 220. For instance, when a sequence is started, the command stream 220 will be at position zero. Thereafter position one is accessed, followed by position two, etc. The command stream 220 may include instructions to jump to different places in such command stream 220 or in portions of the binary formatted file 218. The virtual machine registers 414 can maintain pointers to indicate where in the binary formatted file 218 or command stream 220 the virtual machine 406 is desirably executing.

System 400 can further include a virtual machine engine 416 that can execute P-Codes provided in the binary formatted file 218. For each P-Code in a binary formatted file 218 there is corresponding code in the virtual machine engine 416 that is instructive as to desired results of the P-Code. Thus, in an example, if the virtual machine 406 is executing a command in the command stream 220 that causes an element to be generated, the virtual machine engine 416 accesses one of the virtual machine stack 410 or the virtual machine call stack 412 and obtains information from such stack, and also obtains information from the virtual machine registers 414 as to where the virtual machine 406 is to be executing when the virtual machine 406 calls in to the virtual machine engine 416 to create the element.

In summary, the virtual machine 406 parses code in the command stream 220, uses the virtual machine stack 410, the call stack 412, the virtual machine registers 414 and the virtual machine engine 416, and builds a user interface tree 418. User interface tree 418 can be a representation of a graphical user interface that is desirably displayed on a display screen of a computing device.

Figure 5:
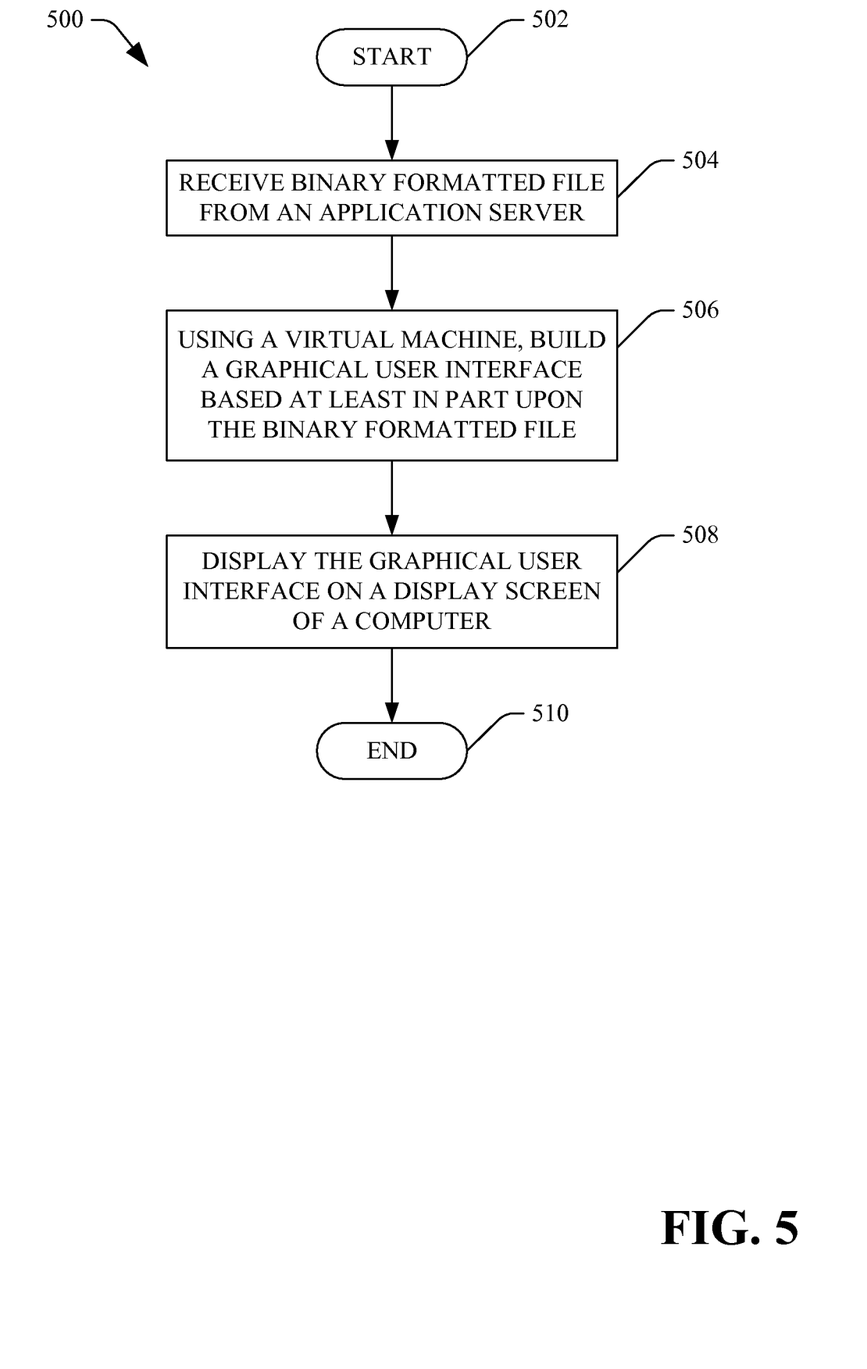
FIG. 5 is flow diagram that illustrates an example methodology for displaying a graphical user interface on a display screen through use of a binary formatted file.
Figure 6:
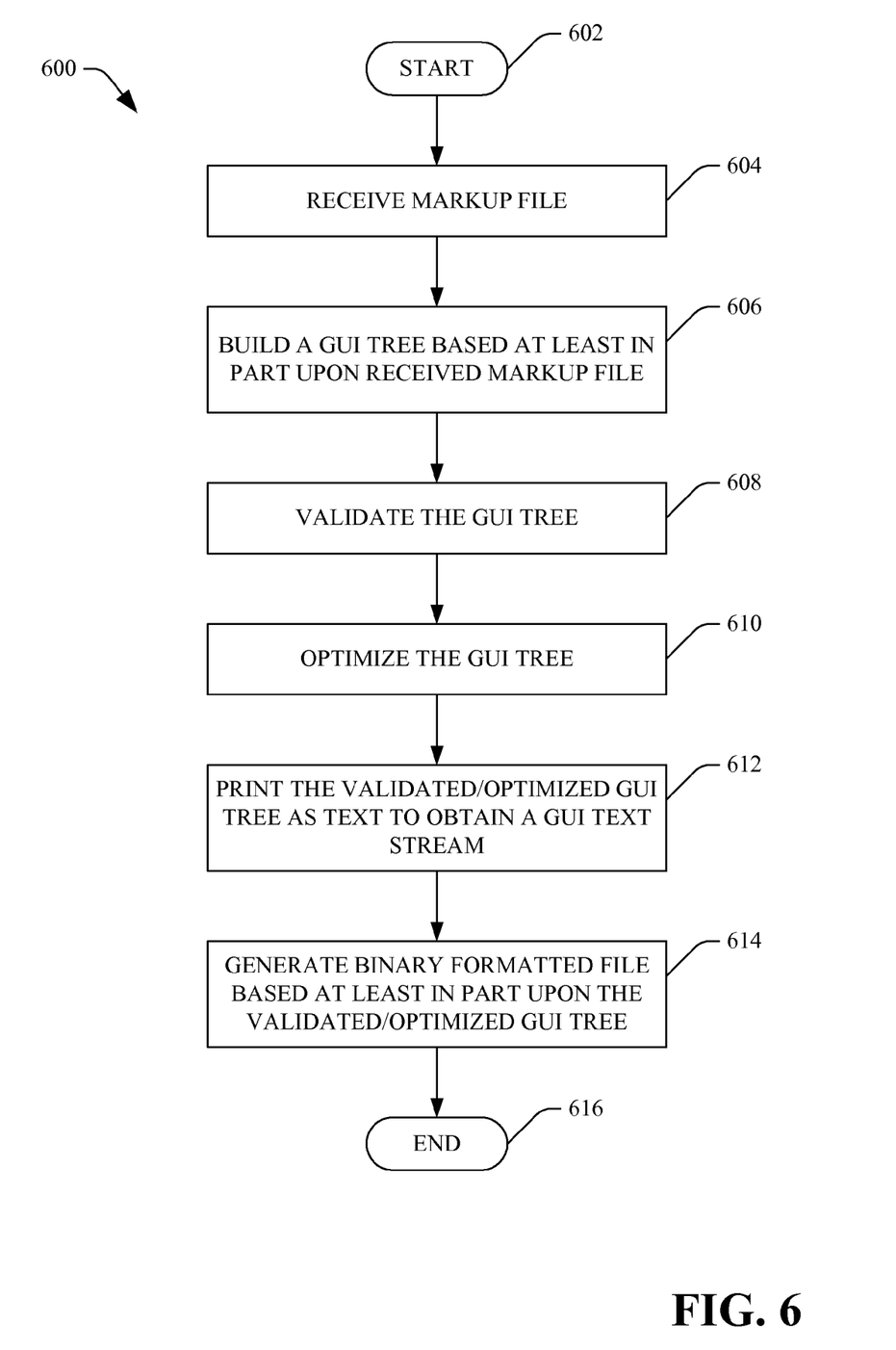
FIG. 6 is a flow diagram that illustrates an example methodology for generating a binary formatted file for use in connection with generating a graphical user interface.
Figure 7:
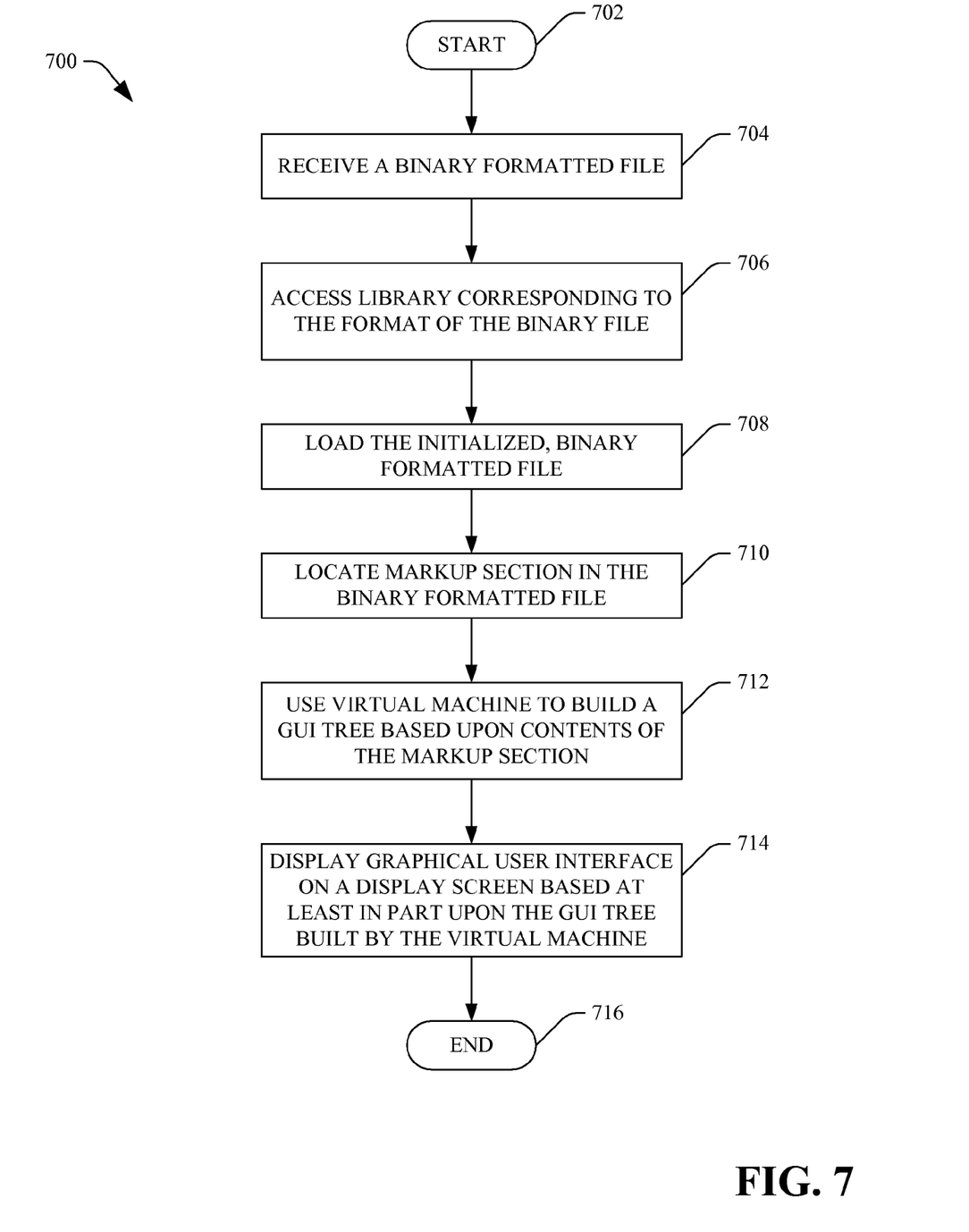
FIG. 7 is a flow diagram that illustrates an example methodology for displaying a graphical user interface on a display screen through use of a binary formatted file.

With reference now to FIGS. 5-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates displaying a graphical user interface on a display screen of a computer is illustrated. The methodology 500 begins at 502, and at 504 a binary formatted file is received from an application server. The binary formatted file may be used in connection with generating a graphical user interface for an application downloaded from the application server. For instance, the application may be an instant messenger application, an e-mail application, a digital photography editing application, a movie editing application, a software development tool or other suitable application that is configured to be executed by a user on a client computing device, such as a personal computer. In addition, the received binary formatted file may include commands that can cause elements, properties, values, etc. to be generated on the client device or can be shipped together with a command stream that includes such commands.

At 506, a virtual machine can be used to build a graphical user interface that is based at least in part upon the binary formatted file. For instance, the virtual machine can parse the binary formatted file to generate a graphical user interface tree and the graphical user interface can be built based at least in part upon such tree.

At 508, the graphical user interface is displayed on a display screen of a computer. The methodology 500 completes at 510.

Now referring to FIG. 6, an example methodology 600 that facilitates generating a binary formatted file for use in connection with building a graphical user interface is illustrated. The methodology starts at 602, and a 604 a markup file is received. The markup file can be a file formatted in accordance with a markup language which may be similar to HTML.

At 606, a graphical user interface tree can be generated based at least in part upon the received markup file. For instance, the markup file can be parsed, and elements, properties, values, etc. in the markup file can be represented by nodes in the graphical user interface tree. Each node in the graphical user interface tree can be instances of a main class.

At 608, the graphical user interface tree can be validated. For instance, a determination can be made that the graphical user interface tree is balanced (e.g., that when an element is open in the markup file, it is closed).

At 610, the graphical user interface tree can be optimized. For instance, subtrees can be located in the graphical user interface tree, wherein subtrees have substantially similar nodes and arrangements of parents and children. A subtree can be consolidated such that it appears a single time in the graphical user interface tree and is referenced in other locations where it occurred in the non-optimized tree. Furthermore, null nodes in the graphical user interface tree can be pruned from such tree.

At 612, in an optional act, the validated/optimized tree can be printed as text to obtain a graphical user interface text stream. Such text stream can be analyzed by a developer if at runtime the graphical user interface does not build correctly. For instance, the graphical user interface text stream can be analyzed to determine if a bug exists in the markup file received at 604 or in a component that builds the graphical user interface based at least in part upon the optimized tree.

At 614, a binary formatted file is generated based at least in part upon the validated/optimized tree. As noted above, the binary formatted file may include offsets to element tables, property tables, value tables, style tables, etc. The binary formatted file may also include a markup section that comprises an index to a representation of the optimized tree and/or the optimized tree. Furthermore, the binary formatted file may include or be shipped with a command stream that includes commands that can cause a virtual machine, for instance, to build the graphical user interface. The binary formatted file may be shipped with a dynamic link library from an application server to a client computing device. The methodology 600 completes at 616.

Referring now to FIG. 7, an example methodology 700 for displaying a graphical user interface on a display screen is illustrated. The methodology 700 starts at 702, and at 704 a binary formatted file is received. As indicated above, the binary formatted file may include or be shipped with a command stream that includes commands to generate elements, properties, values, styles, etc. Furthermore, the binary formatted file can be received at or within a client computing device such as a personal computer, a personal digital assistant, etc.

At 706, a library corresponding to the format of the binary formatted file is accessed. For instance, the accessed library can include information that allows the binary formatted file to be interpreted at runtime. Accessing the library can cause the binary formatted file to be initialized which can include setting up tables in memory of elements, properties, values, etc. for access by a virtual machine.

At 708 the initialized binary formatted file is loaded in preparation for being accessed by a virtual machine.

At 710 a markup section in the binary formatted file is located. The markup section can be located by analyzing a header in the binary formatted file. For instance, the markup section can include an index to a representation of a graphical user interface tree, the graphical user interface tree, and/or commands that can be used to generate the graphical user interface tree.

At 712 a virtual machine is used to build the graphical user interface tree based at least in part upon contents of the markup section, which may include one or more commands. Example commands have been provided above. When building the graphical user interface tree, the virtual machine can use multiple stacks, a virtual machine register, and a virtual machine engine, for instance. In another example, the virtual machine may use a single stack. In still yet another example, the virtual machine may use more than two stacks in connection with building the graphical user interface tree.

At 714, the graphical user interface is displayed on a display screen of a computer device based at least in part upon the graphical user interface tree built by the virtual machine at act 712. The methodology 700 completes at 716.

Figure 8:
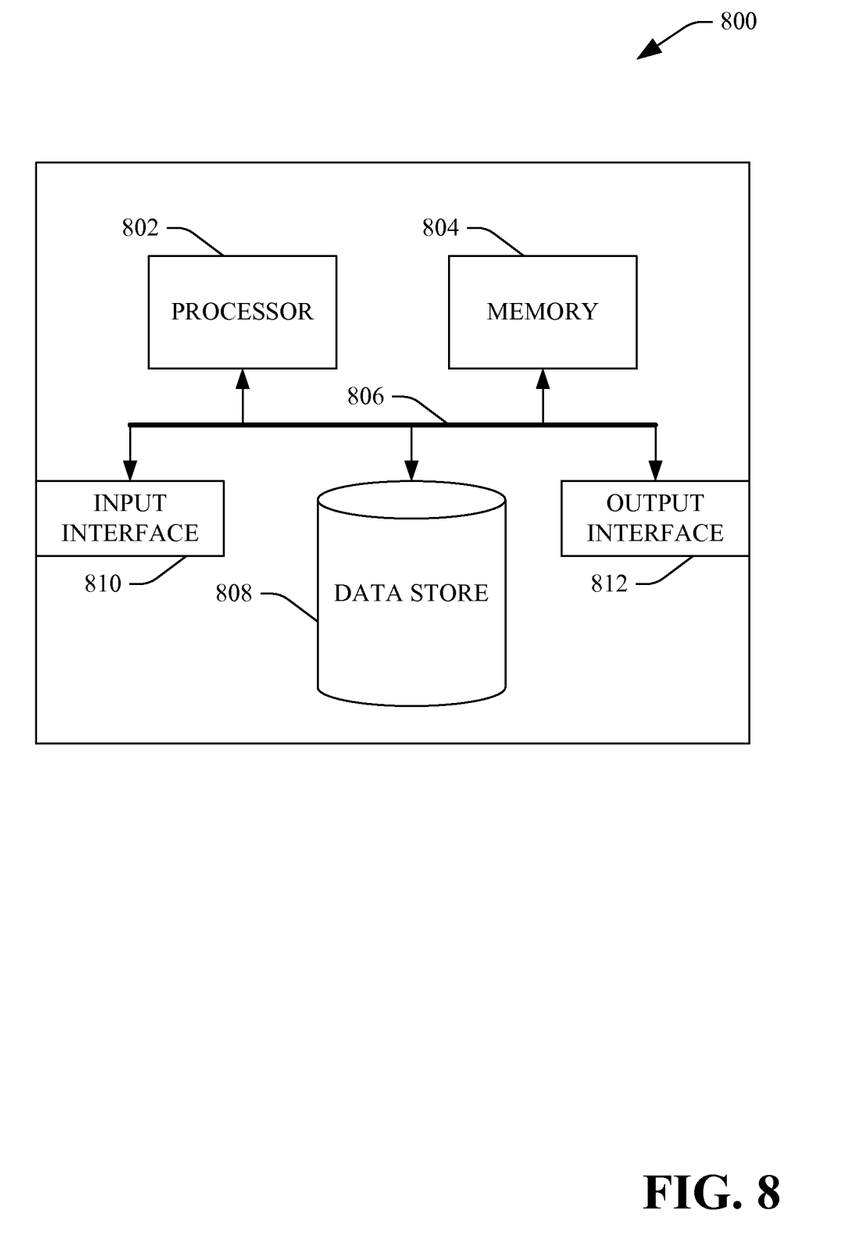
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports building a graphical user interface or generating a binary formatted file. In another example, at least a portion of the computing device 800 may be used in a system that supports providing an application to a client computer device. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a binary formatted file, command stream, a dynamic link library, etc.

The computing device 800 additionally includes a data store 808 that is accessible by the processor 802 by way of the system bus 806. The data store 808 may include executable instructions, a binary formatted file, a command stream, a representation of a graphical user interface tree, etc. The computing device 800 also includes an input interface 810 that allows external devices to communicate with the computing device 800. For instance, the input interface 810 may be used to receive instructions from an external computer device, from an application server, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising acts that are executed by a computing device, the method comprising:
   receiving a binary formatted file, the binary formatted file is based upon a markup file, the binary formatted file comprises a plurality of tables and a header, the header includes a signature, a version number, and offsets to the plurality of tables in the binary formatted file;
   creating a graphical user interface tree by parsing the binary formatted file, the graphical user interface tree includes nodes that represent elements of a graphical user interface that is to be rendered on a display of the computing device;
   building the graphical user interface based upon the graphical user interface tree, wherein a virtual machine executing on the computing device builds the graphical user interface; and
   displaying the graphical user interface on the display, the graphical user interface comprises the elements.

2. The method of claim 1, wherein a table in the plurality of tables is a string table that includes an index to strings in the markup file, the strings occur numerous times in the markup file.

3. The method of claim 1, wherein a table in the plurality of tables is an element table that describes graphical elements that are included in the graphical user interface.

4. The method of claim 3, wherein a second table in the plurality of tables is a property table that indexes properties that describe elements listed in the element table.

5. The method of claim 4, wherein a third table in the plurality of tables is a value table that indexes values for the properties listed in the property table.

6. The method of claim 1, wherein a table in the plurality of tables is a markup table that indexes subtrees of a main tree corresponding to the graphical user interface.

7. The method of claim 3, wherein a table in the plurality of tables is a style table that indexes styles of at least one element listed in the element table.

8. The method of claim 3, wherein a table in the plurality of tables is a script table that indexes actions corresponding to at least one element listed in the element table.

9. The method of claim 1, further comprising receiving a dynamic linked library for the binary formatted file together with the binary formatted file, wherein the graphical user interface is built based upon the dynamic linked library for the binary formatted file.

10. The method of claim 1, further comprising selecting the binary formatted file based upon an identification assigned to the binary formatted file.

11. The method of claim 1, further comprising creating a virtual machine stack and a virtual machine call stack to facilitate re-entrances.

12. The method of claim 1, wherein creating the graphical user interface tree comprises constructing a syntax tree, the syntax tree constructed based upon a tree in a markup section of the binary formatted file.

13. A system that facilitates generating and displaying a graphical user interface on a display, the system comprising:
   a processor; and
   memory that stores instructions that, when executed by the processor, cause the processor to perform acts comprising:
      receiving a binary formatted file that is based upon a markup file, the binary formatted file comprises a plurality of tables and a header, the header includes a signature, a version number, and offsets to the plurality of tables in the binary formatted file;
      generating a graphical user interface tree by parsing the binary formatted file, wherein the graphical user interface tree includes a node that represents an element of a graphical user interface that is to be rendered on the display;
      generating the graphical user interface based upon the graphical user interface tree, wherein the graphical user interface is generated by a virtual machine executed by the processor; and
      causing the graphical user interface to be displayed on the display.

14. The system of claim 13, wherein the virtual machine generates the graphical user interface based upon the offsets to the plurality of tables.

15. The system of claim 14, wherein the plurality of tables include an elements table, a properties table, and a value table, wherein an element in the elements table is an entity that is to be displayed in the graphical user interface, a property in the properties table describes the element, and a value in the value table describes the property.

16. The system of claim 13, wherein the markup file is received from an application server.

17. The system of claim 13 comprised by a mobile telephone.

18. A computing device comprising a computer-readable medium, the computer-readable medium comprising instructions that, when executed by a processor, cause the processor to perform acts comprising:
   receiving a binary formatted file from an application server, the binary formatted file is based upon a markup file and includes a header that comprises a signature, a version number, and data indicating a size of the binary formatted file;
   parsing the binary formatted file to create a graphical user interface tree, wherein the graphical user interface tree includes a first node that represents an element to be displayed in a graphical user interface, a second node that represents a property that describes the element, and a third node that represents a value that describes the property, the third node being a child of the second node, the second node being a child of the first node; and
   using a virtual machine to cause the graphical user interface to be displayed on a display screen of a computer device based at least in part upon the graphical user interface tree.

19. The computing device of claim 18, the binary formatted file comprises a string table that includes an index to strings that occur repeatedly in the markup file.

20. The computing device of claim 18, the header further comprises an index to a plurality of tables in the binary formatted file, the plurality of tables include an element table, a property table, and a value table.

* * * * *